US010332058B1

(12) United States Patent
Kandregula et al.

(10) Patent No.: US 10,332,058 B1
(45) Date of Patent: Jun. 25, 2019

(54) REAL TIME COMMUNICATION FOR CARRIER OPERATIONS

(71) Applicant: Amazon Technologies, Inc., Reno, NV (US)

(72) Inventors: Krishnaditya Kandregula, Rajahmundry (IN); Nimish Kasat, Indore (IN); Palvali Teja Burugu, Seattle, WA (US); Swapnil Shukla, Hyderabad (IN)

(73) Assignee: Amazon Technologies, Inc., Reno, NV (US)

( * ) Notice: Subject to any disclaimer, the term of this patent is extended or adjusted under 35 U.S.C. 154(b) by 1399 days.

(21) Appl. No.: 14/317,527

(22) Filed: Jun. 27, 2014

(51) Int. Cl.
G06Q 10/08 (2012.01)
H04L 29/08 (2006.01)

(52) U.S. Cl.
CPC ......... *G06Q 10/083* (2013.01); *H04L 67/125* (2013.01); *G06Q 10/08* (2013.01); *G06Q 10/0835* (2013.01)

(58) Field of Classification Search
CPC .................................................. G06Q 10/083
See application file for complete search history.

(56) References Cited

U.S. PATENT DOCUMENTS

| | | | | | |
|---|---|---|---|---|---|
| 6,148,291 | A | * | 11/2000 | Radican | G06Q 10/08 705/22 |
| 2001/0041948 | A1 | * | 11/2001 | Ross | G06Q 10/08 700/226 |
| 2002/0161509 | A1 | * | 10/2002 | Fawcett | G06Q 10/087 705/28 |
| 2004/0199285 | A1 | * | 10/2004 | Berichon | G06Q 10/06 700/225 |
| 2004/0246130 | A1 | * | 12/2004 | Lambright | G06Q 10/08 340/539.26 |

(Continued)

FOREIGN PATENT DOCUMENTS

WO    WO-2008057504 A2 *  5/2008  ............. G08C 21/00

OTHER PUBLICATIONS

Aryal, Sameer, Integrating camera recognition and RFID system for assets tracking and warehouse management, Apr. 2012, Central Ostrobothnia University of Applied Sciences (Year: 2012).*

*Primary Examiner* — Kevin H Flynn
*Assistant Examiner* — Wayne S. Murray
(74) *Attorney, Agent, or Firm* — Thomas Horstemeyer, LLP (57) ABSTRACT

Aspects of real time communications for carrier operations are described. In one embodiment, a shipping or operations schedule may include information associated with containers awaiting disposition at a materials handling facility. Based on a schedule of vehicles expected to arrive for loading or unloading the containers, for example, one or more move plan messages may be generated and forwarded to carriers. When a carrier starts a loading or unloading operation at the materials handling facility, messages from the carrier, such as load start, move update, or load complete messages may be received. The messages may be used to update the shipping or operations schedule in an ongoing fashion. Further, a display may be generated based on the updated shipping or operations schedule. By reference to the display, it may be possible to identify holdups, backups, errors, or other problems in loading and/or unloading operations at the materials handling facility.

20 Claims, 6 Drawing Sheets

(56) References Cited

U.S. PATENT DOCUMENTS

| | | | | |
|---|---|---|---|---|
| 2006/0011721 A1* | 1/2006 | Olsen, III | .............. | G06Q 10/06 |
| | | | | 235/385 |
| 2014/0229399 A1* | 8/2014 | Ranganathan | ....... | G06Q 10/083 |
| | | | | 705/337 |
| 2014/0361077 A1* | 12/2014 | Davidson | ............... | G06Q 10/08 |
| | | | | 235/385 |

* cited by examiner

Browser – Materials Handling Facility Operations Schedule

File   Edit   View   Tools   Help http://...

● All | Scheduled | In Progress | Complete

Current Time: 15:18

| Plan ID | Carrier | Route | Expected Load Time | Actual Load Time | Staged | Loaded | Ready to Depart | Departed |
|---|---|---|---|---|---|---|---|---|
| 1 | UPZ | UPZ-1 | 5/1/2013 10:32 | 5/1/2013 10:15 | 7 | 7 | 7 | 7 |
| 2 | USZ | USZ-4 | 5/1/2013 11:12 | 5/1/2013 11:15 | 5 | 5 | 5 | 5 |
| 3 | UPZ | UPZ-5 | 5/1/2013 13:52 | ** | 3 | 0 | 0 | 0 |
| 4 | UPZ | UPZ-3 | 5/1/2013 14:52 | 5/1/2013 15:01 | 5 | 2 | 0 | 0 |
| 5 | USZ | USZ-2 | 5/1/2013 14:58 | 5/1/2013 15:03 | 2 | 2 | 2 | 0 |
| 6 | USZ | USZ-7 | 5/1/2013 22:52 | ** | 3 | 0 | 0 | 0 |

402

Container #1: ID=GX123; Weight=350lbs.; Location=6A
Container #2: ID=GX124; Weight=321lbs.; Location=6B
Container #3: ID=GX125; Weight=289lbs.; Location=6C

REAL TIME COMMUNICATION FOR CARRIER OPERATIONS

BACKGROUND

At a materials handling facility, for example, various items, articles, or products may be organized into containers for shipment to other locations. A carrier may arrive at the materials handling facility to load the containers onto a trailer from a shipping dock. In turn, the carrier may transport the containers to another downstream handling facility or a final destination in the processing or shipment chain. Generally, for any given materials handling facility, it is important to monitor the schedule and progress of the transportation of the containers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Today, more and more items (e.g., products, clothing, food, etc.) are being shipped by carriers (e.g., United States Postal Service®, United Parcel Service®, Federal Express®, etc.) to consumers. Thus, it has become more important to bring efficiency to the distribution chains through which these items are being transported. Additionally, it has become important to carefully track and monitor the schedules by which these items are transported, to ensure compliance with the expectations of and commitments to the consumers. Because a great number of items are processed at and pass through materials handling facilities, for example, it would be helpful to have the ability to track and monitor carrier operations, such as loading and unloading operations, among others, at those facilities in an ongoing, real-time fashion. In this context, according to the embodiments described herein, certain carrier operations may be tracked and/or monitored at such facilities using messages communicated between a computing environment and carriers in an ongoing, real-time fashion.

Figure 1:
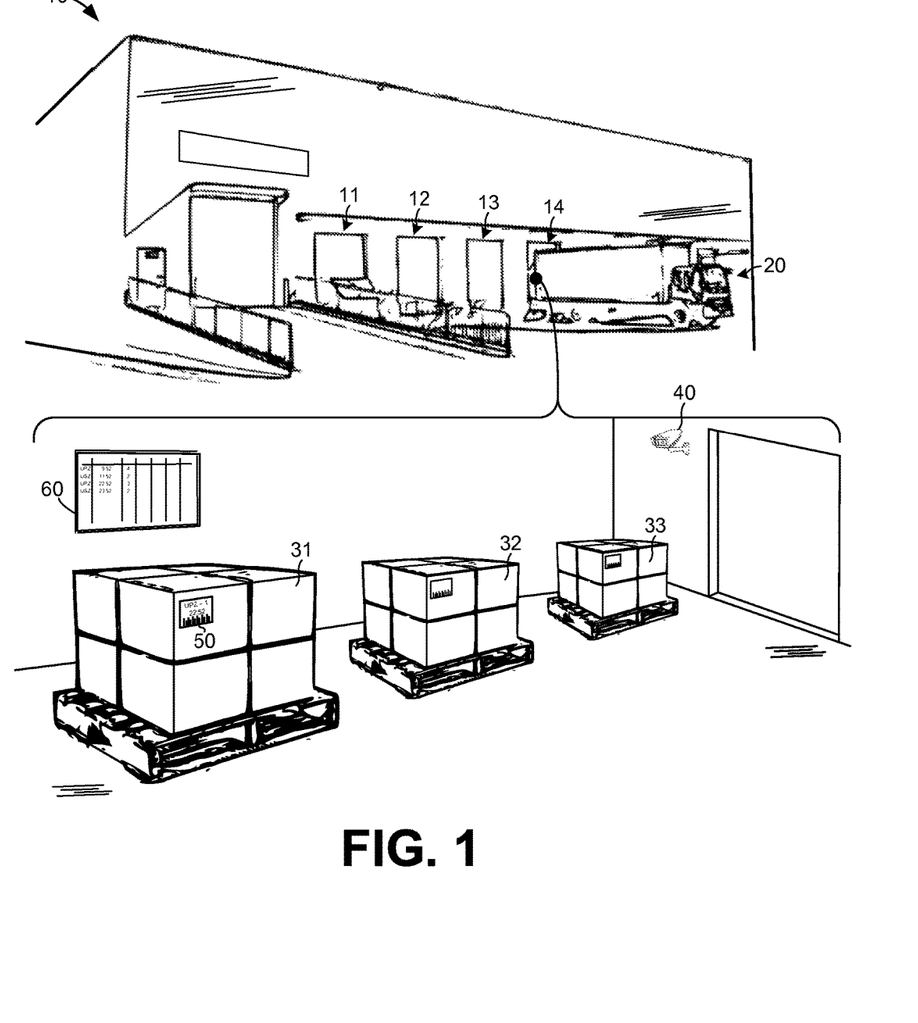
FIG. 1 illustrates a representative materials handling facility at which carrier operations may occur according to various embodiments of the present disclosure.

For additional example context, FIG. 1 illustrates a representative materials handling center or facility 10. In various embodiments, the materials handling facility 10 may be a sort center, shipping center, packing center, distribution center, or other shipping, handling, or packing facility, among other similar facilities. At the materials handling facility 10, among other operations, various items may be organized into containers 31-33 (e.g., pallets, packages, bins, boxes, cartons, parcels, etc.) for shipment to other locations. Further, various carrier operations may occur at the materials handling facility 10, such as loading the containers 31-33 onto trucks or trailers, unloading containers off of trucks or trailers, etc. For loading and unloading, the materials handling facility 10 may include several loading bays and doors 11-14. One or more vehicles of one or more carriers, such as the truck 20, may arrive at the materials handling facility 10 for loading and/or unloading the containers 31-33, among other containers. The carriers may transport the containers 31-33 to other materials handling facilities or destinations in the distribution chain using the trucks. Here, it should be appreciated that, while the containers 31-33 appear in FIG. 1 as pallets of stacked boxes, other types or styles of packages or packaging (e.g., pallets, packages, bins, boxes, cartons, bulk boxes, bulk bins, skid boxes, tote boxes, gaylords, etc.) may be picked up or dropped off at the materials handling facility 10.

According to the embodiments described herein, several of the carrier operations at the materials handling facility 10, such as loading and/or unloading, may be tracked and/or monitored by way of the computing environment 110 (FIG. 2), as further described below. The computing environment 110 may schedule, track, and/or monitor the operations at the materials handling facility 10 using various operations messages, such as vehicle run information messages, move plan messages, move update messages, load update messages, etc., communicated between the computing environment 110 and the carriers by way of the carrier computing platform 152 and the network 150 (FIG. 2), as further described below. The operations messages may be structured in any suitable format among the embodiments. As one example, the operations messages may be formatted as JavaScript Object Notation (JSON) data-interchange format messages.

Some of the messages may be communicated between the computing environment 110 and the carriers when (i.e., at about the time of) loading and unloading one or more containers. Thus, according to the embodiments, by tracking the ongoing communications by way of the messages, the computing environment 110 may provide an ongoing, real-time display of the operations which are underway at the materials handling facility 10. For example, as illustrated in FIG. 1, the display 60, which may be embodied as a television-sized monitor or display, may be provided at a location for easy reference by the driver of the truck 20 when loading the containers 31-33. By reference to the contents of the display 60, as updated in an ongoing, real-time fashion based on the operations underway at the materials handling facility 10, it may be possible for the driver of the truck 20 or an operator at the materials handling facility 10 to identify holdups, backups, errors, or other problems in loading and/or unloading operations at the materials handling facility 10. By monitoring the operations with reference to the display 60 (or another display of a client or display terminal), greater efficiency and fewer errors may result at the materials handling facility 10.

According to other aspects of the embodiments, by comparing a real-time survey of the containers 31-33 in the materials handling facility 10 and the ongoing communications between the computing environment 110 and the carrier computing platform 152, the computing environment 110 may identify errors or other problems in the operations at the materials handling facility 10. In various embodiments, the real-time survey of the containers 31-33 may be taken using one or more imaging devices, such as the camera 40, or one or more radio frequency identifier (RFID) tags, for example. If the real-time survey indicates that a particular container is being moved, for example, even though the carrier scheduled to move the particular container has not yet arrived, the computing environment 110 may generate an error or trouble message. With reference to such an error message, an individual or operator at the materials handling facility 10 may be able to prevent an error in operations (e.g., mistaken loading) at the materials handling facility 10.

Figure 2:
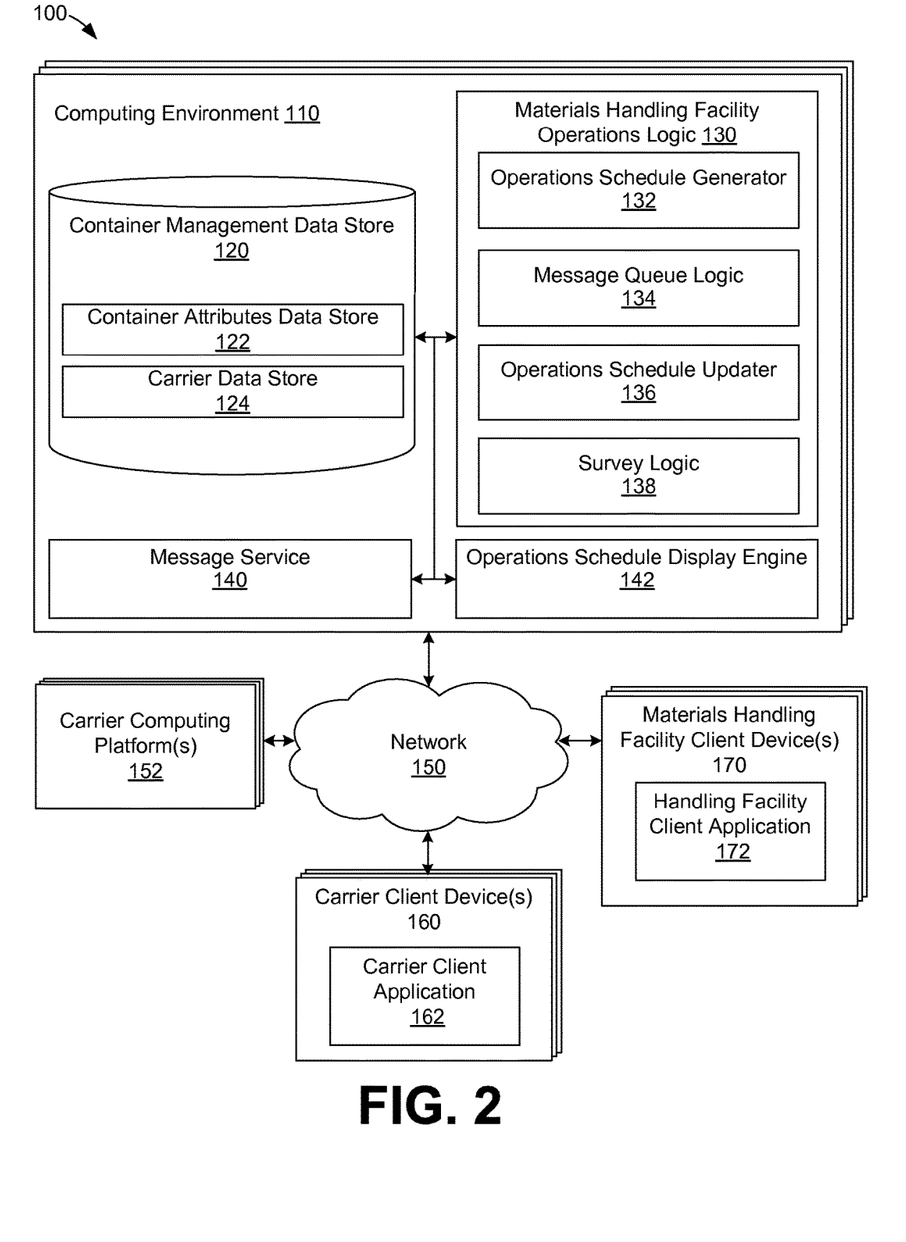
FIG. 2 illustrates a networked environment for real time carrier operations according an example embodiment of the present disclosure.

Turning to FIG. 2 in further detail, a more detailed description of the embodiments is provided. In the following paragraphs, a general description of a system for real time carrier operations is provided, followed by a discussion of the operation of the same.

FIG. 2 illustrates a networked environment 100 for real time carrier operations according to an example embodiment of the present disclosure. The networked environment 100 includes the computing environment 110, a network 150, a carrier computing platform 152, a carrier client device 160, and a materials handling facility client device 170. The computing environment 110 may be embodied as one or more computers, computing devices, or computing systems. In certain embodiments, the computing environment 110 may include one or more computing devices arranged, for example, in one or more server or computer banks. The computing device or devices may be located at a single installation site or distributed among different geographical locations. As further described below in connection with FIG. 6, the computing environment 110 may include a plurality of computing devices that together embody a hosted computing resource, a grid computing resource, and/or other distributed computing arrangement. In some cases, the computing environment 110 may be embodied as an elastic computing resource where an allotted capacity of processing, network, storage, or other computing-related resources varies over time.

The computing environment 110 may also be embodied, in part, as various functional and/or logic (e.g., computer-readable instruction, device, circuit, processing circuit, etc.) elements executed or operated by the computing environment 110 to direct the computing environment 110 to perform aspects of the embodiments described herein. As illustrated in FIG. 2, the computing environment 110 includes a container management data store 120, materials handling facility operations logic 130, a message service 140, and a shipping or operations schedule display engine 142, each of which is further described below.

Generally, the computing environment 110 generates a shipping or operations schedule for the materials handling facility 10 (and/or other materials handling facilities) and communicates with the carrier computing platform 152 using operations messages. As further described below, the computing environment 110 may update the shipping or operations schedule over time based on the ongoing carrier operations at the materials handling facility 10. At least in part, the computing environment 110 may monitor the ongoing operations at the materials handling facility 10 by inspection of the operations messages received from the carrier computing platform 152. In one embodiment, the computing environment 110 and the carrier computing platform 152 may exchange various operations messages using the message service 140, as further described below. The computing environment 110 may also generate a network page to display the shipping or operations schedule of the materials handling facility 10, as a user interface, for example, with updates to the shipping or operations schedule being provided over time. By reference to the user interface, it may be possible for an individual to identify holdups, backups, errors, or other problems in loading and/or unloading operations at the materials handling facility 10.

The network 150 may include the Internet, intranets, extranets, wide area networks (WANs), local area networks (LANs), wired networks, wireless networks, cable networks, satellite networks, other suitable networks, or any combinations thereof. It is noted that the computing environment 110 may communicate with the carrier client device 160 and the materials handling facility client device 170 using various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. It is noted here that, although not illustrated, the network 150 includes connections to any number of network hosts, such as website servers, file servers, networked computing resources, databases, data stores, or any other network or computing architectures.

The carrier computing platform 152 may be embodied as one or more computers, computing devices, or computing systems of one or more carriers. Among other operations, the carrier computing platform 152 may schedule, oversee, and maintain the operations of a fleet of vehicles for one or more carriers. Thus, for example, the carrier computing platform 152 may schedule and track the routes of various vehicles, such as the truck 20 (FIG. 1), and track any containers that are loaded onto or unloaded off of the vehicles.

The carrier computing platform 152 may also provide instructions to and oversee the operations of the drivers of the trucks. For example, each truck driver may use one of the carrier client devices 160 to receive operating instructions from the carrier computing platform 152. The operating instructions may provide instructions related to transportation routes, facility addresses or identifiers, pick-up or drop-off times, dock door identifiers, container identifiers, etc. With reference to the operating instructions, the truck drivers may conduct the necessary loading or unloading operations at one or more materials handling facilities, for example.

The carrier client device 160 and the materials handling facility client device 170 (i.e., the client devices 160 and 170) are each representative of one or more client devices. The client devices 160 and 170 may be embodied as any computing device, processing circuit, or processor based device or system, including those embodied in the form of a desktop computer, a laptop computer, a personal digital assistant, a wearable computing device, a cellular telephone, or a tablet computer, among other example computing devices and systems. The client devices 160 and 170 may also include one or more peripheral devices. In this context, the peripheral devices may include one or more input devices, such as a keyboard, keypad, touch pad, touch screen, microphone, scanner, mouse, joystick, camera, or one or more push buttons, etc. The peripheral devices may also include a display, indicator lights, speakers, global navigation satellite system (GNSS) circuitry, accelerometer, or other components, depending upon the primary use of the client devices 160 and 170.

As illustrated in FIG. 2, the client devices 160 and 170 may execute various applications, such as the carrier client application 162 and the materials handling facility client application 172, respectively. In one embodiment, the carrier client application 162 may be embodied as a carrier operations application that interacts with the carrier computing platform 152 via the network 150. To this end, the carrier client application 162 may relay operating instructions from the carrier computing platform 152 to the carrier client device 160, and relay indicators of ongoing carrier operations from the carrier client device 160 to the carrier computing platform 152.

For example, the carrier client application 162 may relay operating instructions from the carrier computing platform 152 to the carrier client application 162 for loading the container 31 at the materials handling facility 10 (FIG. 1). The driver of the truck 20, by referencing the operating instructions relayed to the carrier client application 162, may perform a loading process, for example, according to the instructions. In turn, at certain points during the loading process, the driver of the truck 20 may provide inputs to the carrier client application 162. The inputs may reflect or indicate the performance of certain operations, such as arrival of the truck 20 at the materials handling facility 10, the start of loading the container 31 (and/or other containers), the end of loading the container 31 (and/or other containers), etc. These inputs are relayed back to the carrier computing platform 152 by the carrier client device 160. As further described below, in response to the inputs received from the carrier client device 160, the carrier computing platform 152 may communicate one or more messages to the computing environment 110. Using the messages, the computing environment 110 may update the shipping or operations schedule of the materials handling facility 10. In this way, using the messages from carriers, the schedule of loading, unloading, etc. for various containers at the materials handling facility 10 may be updated in an ongoing, real-time fashion.

In one embodiment, the materials handling facility client application 172 may be embodied as an operations application that interacts with the computing environment 110 via the network 150. The materials handling facility client application 172 may be relied upon to display the shipping or operations schedule generated by the operations schedule generator 132, for example, as further described below. In various embodiments, the display of the shipping or operations schedule may be provided as a user interface including a list of scheduled loading or unloading plans for containers (e.g., as in FIG. 4) or a floor plan view of containers at the loading bays of the materials handling facility 10 (e.g., as in FIG. 5). It should be appreciated, however, that other formats for display of the shipping or operations schedule are within the scope of the embodiments.

As noted above, the operations schedule display engine 142 may generate a display or network page to be rendered as a user interface on the materials handling facility client device 170. In this case, the materials handling facility client application 172 may be embodied as an available off-the-shelf hypertext-based internet browser such as Internet Explorer®, Firefox®, Chrome®, Silk®, or another type of browser, or a variant thereof, without limitation. Further, the materials handling facility client application 172 may render the display or network page as a webpage including the shipping or operations schedule and, in some aspects and embodiments, a user interface for interacting with the shipping or operations schedule and/or the computing environment 110.

Referring again to FIG. 2, the materials handling facility operations logic 130 includes an operations schedule generator 132, message queue logic 134, an operations schedule updater 136, and survey logic 138. The operations schedule generator 132 may generate an initial shipping or operations schedule for the materials handling facility 10 (and/or other materials handling facilities). For example, based on the ongoing operations at the materials handling facility 10, the operations schedule generator 132 may generate an initial list of containers that are awaiting pickup by one or more carriers (i.e., awaiting to be shipped). In some embodiments, this initial list of containers may be relied upon to request pickup service by one or more carriers. Further, to the extent that the containers include packages with time-sensitive delivery dates, for example, the operations schedule generator 132 may populate the initial shipping or operations schedule with expected load times for each of the containers. Additionally, the operations schedule generator 132 may populate the initial shipping or operations schedule with a suggested or anticipated carrier and/or route information for each of the containers.

The message queue logic 134 may access the message service 140, as necessary, to post and retrieve messages to and from the message service 140. For example, the message queue logic 134 may access the message service 140 to post move plan messages to the message service 140. The move plan messages may provide one or more carriers with particular information and/or instructions for loading one or more containers at the materials handling facility 10, for example, as further described below. Additionally, the message queue logic 134 may access the message service to retrieve operations messages from one or more carriers regarding the ongoing status of a loading or unloading operation, as further described below.

In one aspect of the embodiments, based on certain operations messages retrieved from one or more carriers via the message service 140, the operations schedule updater 136 may update the initial shipping or operations schedule generated by the operations schedule generator 132. For example, if the message queue logic 134 retrieves a move update message from the carrier computing platform 152 via the message service 140, the operations schedule updater 136 may update the initial shipping or operations schedule accordingly. The updates may occur over time, as new operations messages are received from the carriers. The update operations performed by the operations schedule updater 136 are described in further detail below with reference to FIGS. 3-5.

The survey logic 138 may conduct a real-time survey of the containers in the materials handling facility 10 and compare the shipping or operations schedule with the survey, to identify any discrepancies between the expected and actual status of the containers in the materials handling facility 10. For example, if the shipping or operations schedule of the materials handling facility 10 indicates that the containers 31-33 (FIG. 1) are to be staged at door 14 by 10:15 am for loading onto the truck 20, the survey logic 138 may survey the loading bay at door 14 to determine whether the containers 31-33 are staged for loading by 10:15 am. If the containers 31-33 are not staged for loading, the survey logic 138 may generate an error or trouble message. As another example, if the survey logic 138 identifies that a container is being moved in a manner that is inconsistent with the shipping or operations schedule of the materials handling facility 10, the survey logic 138 may generate an error or trouble message.

In one embodiment, the survey logic 138 may rely upon one or more imaging devices, such as the camera 40 (FIG. 1), to conduct the real-time survey of the containers in the materials handling facility 10. In this regard, the survey logic 138 may include image processing logic or algorithms configured to identify whether one or more containers are located at certain locations throughout the materials handling facility 10. In another example embodiment, the survey logic 138 may rely upon RFID tag readers to conduct the real-time survey. In this case, each of the containers in the materials handling facility 10 may be tagged with an RFID tag. Generally, the survey logic 138 may rely upon any suitable type of tracking means to conduct a survey of the containers in the materials handling facility 10.

The operations schedule display engine 142 may generate a network page for display as a user interface on a client device, such as the materials handling facility client device 170, as described above. In one embodiment, the operations schedule display engine 142 may generate the network page as a hypertext-based page including the shipping or operations schedule, as generated by the operations schedule generator 132 and updated by the operations schedule updater 136. In turn, the materials handling facility client device 170 may render the network page as a user interface for interacting with the shipping or operations schedule and/or the computing environment 110. In some embodiments, the network page may also be provided on a larger display, such as on the television-sized monitor or display 60, for example, positioned at a loading bay as illustrated in FIG. 1.

In various embodiments, the message service 140 may be embodied as a message, notice, or notification service with or without a message or notice queue. In one embodiment, the message service 140 may provision a message queue for each carrier that interfaces with the computing environment 110. Each carrier may maintain separate and distinct login credentials with the message service 140, for posting and retrieving messages (or other data packages) to or from the message service 140 and, hence, the computing environment 110.

Generally, the carriers and the materials handling facility 10 may communicate operations messages between the carrier computing platform 152 and the computing environment 110 via the message service 140. It should be appreciated that the message service 140 is provided as one example of a suitable means to exchange messages between the carrier computing platform 152 and the computing environment 110, and other means may be relied upon among various embodiments. It should also be appreciated that the message service 140 may be separate from the computing environment 110 in certain embodiments.

The container management data store 120 includes the container attributes data store 122 and the carrier data store 124. The materials handling facility operations logic 130 references and updates the container attributes data store 122, for example, when generating and updating the shipping or operations schedule. For instance, the materials handling facility operations logic 130 may assign one or more containers to each of several move plans. For a particular move plan, the container attributes data store 122 may store container attribute data for each container assigned to the particular move plan.

Among other attribute data, the data stored in the container attributes data store 122 may include carrier assignment data, route assignment data, staging bay data, expected load time data, actual load time data, and loading status data, for example. The container attributes data may further include data related to the type or dimensions of one or more containers (e.g., length, width, height, weight, etc.), bar code identifier data, RFID identifier data, visual identifier data, or other data associated with the physical properties or identification of containers. Generally, the container attributes data store 122 stores any container-related data that may need to be stored, referenced, and/or updated by the materials handling facility operations logic 130 over time.

The carrier data store 124 may also store data related to one or more carriers that perform loading or unloading operations at the materials handling facility 10. For example, the carrier data store 124 may store data related to the carriers that perform loading and unloading operations at the materials handling facility 10. The carrier data store 124 may also store data related to the various routes serviced by the carriers and any identifiers of the vehicles or trailers that are expected to service such routes, over time. As another example, the carrier data store 124 may store data related to which containers are scheduled to be loaded or unloaded by certain carriers. Further, the carrier data store 124 may store data related to which carriers have taken custody of certain containers over time, along with other relevant history data. Generally, the carrier data store 124 stores any carrier-related data that may need to be stored, referenced, and/or updated by the materials handling facility operations logic 130 over time.

Figure 3:
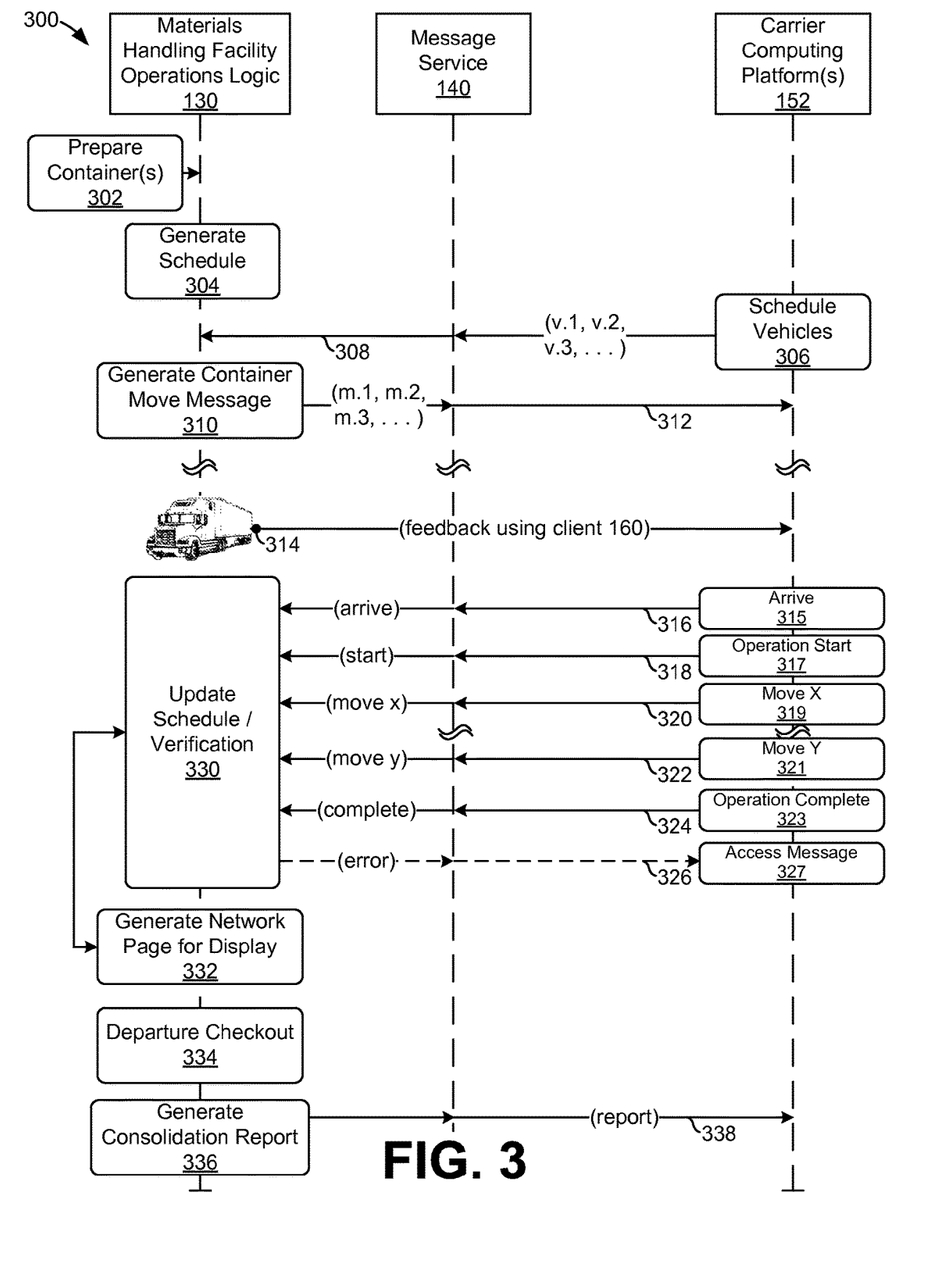
FIG. 3 illustrates an example real time carrier communications and operations process performed by the networked environment of FIG. 2 according to an embodiment of the present disclosure.

FIG. 3 illustrates an example real time carrier communications and operations process 300 performed by the networked environment 100 of FIG. 2 according to an embodiment of the present disclosure. It should be appreciated that that the flowchart of FIG. 3 provides merely one example of a functional sequence or arrangement that may be employed to implement the operations of the networked environment 100, as described herein. Here, it is noted that, although the process 300 is described in connection with elements of the computing environment 110 and the carrier operations platform 152 of FIG. 2, other computing environments or elements may perform the process 300 illustrated in FIG. 3. In certain aspects, the flowchart of FIG. 3 may be viewed as depicting an example group of steps performed by the networked environment 100 according to one or more embodiments.

In FIG. 3, the operations performed by the materials handling facility operations logic 130, the message service 140, and the carrier computing platform 152, respectively, are illustrated. FIG. 3 also illustrates the messages communicated between the materials handling facility operations logic 130 and the carrier computing platform 152. Generally, the message service 140 provides a service for communicating the messages between the materials handling facility operations logic 130 and the carrier computing platform 152.

At reference numeral 302, the process 300 includes preparing one or more containers, such as the containers 31-33 (FIG. 1), for shipment. The preparation of the containers 31-33 at reference numeral 302 is performed in any suitable manner at the materials handling facility 10. For example, the containers may be prepared by one or more individuals based on the need to transport various items to other materials handling facilities or destinations in the distribution chain. Each container 31-33 may include a pallet or other arrangement of various items. For each container 31-33, the materials handling facility operations logic 130 stores information about the items contained within the container in the container attributes data store 122. After each container 31-33 is prepared, a label, such as the label 50 (FIG. 1) may be printed and attached to each container 31-33. For example, among other information, the label 50 may include an identifier of the container 31, an identifier of the carrier that is expected to load the container 31, an identifier of the route by which the carrier is expected to deliver the container 31, and an expected loading time for the container 31.

At reference numeral 304, the process 300 includes generating a shipping or operations schedule for the materials handling facility 10. As described above, the shipping or operations schedule may define one or more loading plans for the containers 31-33, among other containers at the materials handling facility 10. Thus, generating the shipping or operations schedule may include determining a preliminary carrier, route, and expected load time for the containers 31-33. For example, as illustrated in the list view display 400 in FIG. 4, the shipping or operations schedule may define one or more loading plans by plan identifier (i.e., "Plan ID" in FIG. 4). Further, for each loading plan, the shipping or operations schedule may include a carrier identifier (i.e., "Carrier" in FIG. 4), a route identifier (i.e., "Route" in FIG. 4), an expected load time, an actual load time, and a loading status (i.e., "Staged," "Loaded," "Ready to Depart," and "Departed" in FIG. 4) for the containers in the load plan. In some embodiments, the display 400 may present information using display elements such as the rollover or popup display balloon 402. The balloon 402 may provide additional details regarding the 3 containers staged for move plan ID #6. For example, as illustrated, the balloon 402 provides container identifier, weight, and location information, although other relevant information may be provided.

Figure 4:
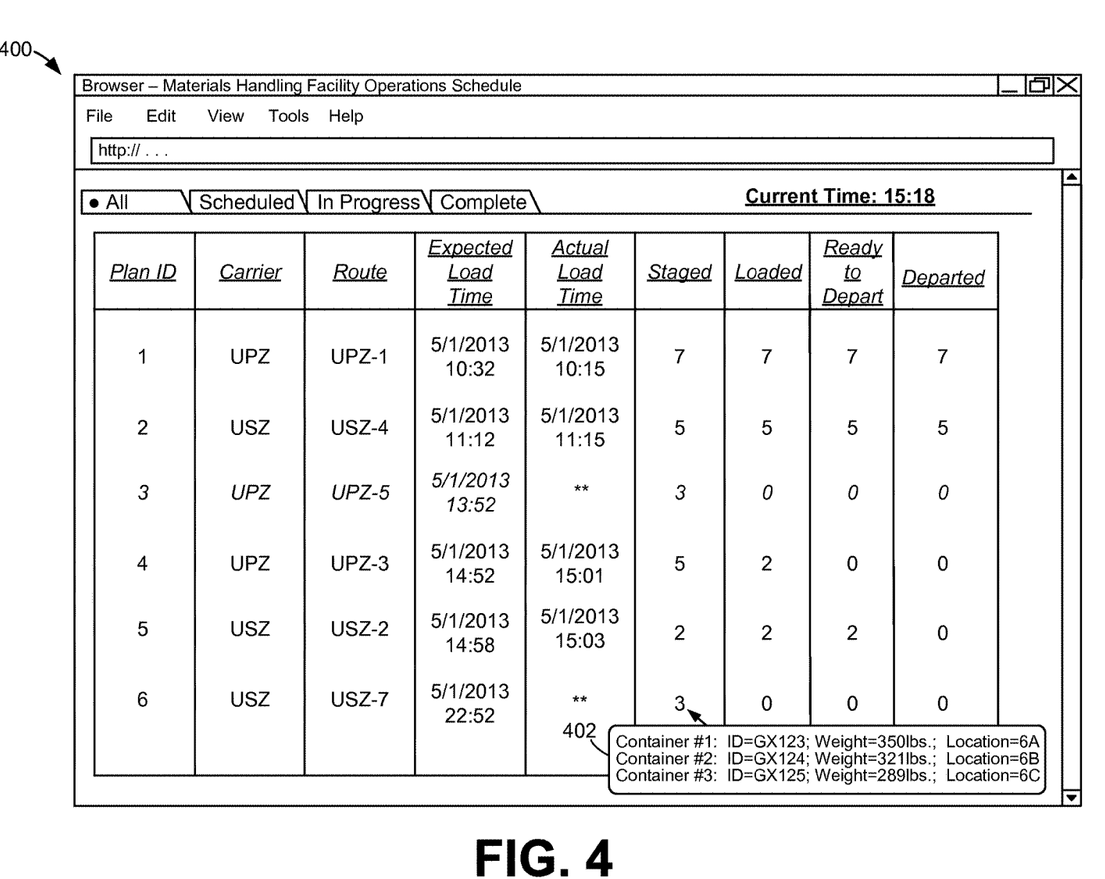
FIG. 4 illustrates an example list view display of a shipping or operations schedule for a materials handling facility according to an embodiment of the present disclosure.

It is noted that the operations schedule display engine 142 may generate a network page for rendering the list view display 400 in FIG. 4 at the materials handling facility client device 170. That is, the materials handling facility client device 170 may render the list view display 400 using a network page generated by the operations schedule display engine 142. The list view display 400 in FIG. 4 is provided by way of example of a display interface which may be relied upon at the materials handling facility 10 to monitor the carrier operations at the materials handling facility 10. In various embodiments, the list view display 400 may display other (i.e., more or less) information related to the containers 31-33, the routes for loading the containers 31-33, and the history of loading operations at the materials handling facility 10, for example. In various embodiments, the materials handling facility client device 170 may be embodied as a desktop or laptop device at a service desk or kiosk at the materials handling facility 10. From the desk, the carrier operations at the materials handling facility 10 may be monitored by individuals at the materials handling facility 10.

It is also noted that the shipping or operations schedule generated at reference numeral 304 may be embodied as a preliminary or initial schedule. This preliminary schedule may include estimates of certain information, such as associated carrier routes, load times, etc., and may be updated over time based on various operations messages received from the carrier computing platform 152.

At reference numeral 306, the process 300 includes scheduling one or more vehicles for loading containers at the materials handling facility 10. Here, the carrier computing platform 152 may schedule the truck 20, for example, for loading containers at the materials handling facility 10 (FIG. 1) and delivering the containers to another location according to one or more predetermined routes. At this point in the process 300, the carrier computing platform 152 schedules the truck 20 for loading containers at the materials handling facility 10 without having any knowledge of which containers need to be loaded at the materials handling facility 10. Instead, the carrier computing platform 152 schedules the truck 20 (and possibly other trucks or vehicles) according to one or more predetermined routes, without prior knowledge of which containers should be loaded at the materials handling facility 10 and delivered on the route.

At reference numeral 308, the process 300 includes communicating one or more vehicle run information messages (e.g., v.1, v.2, v.3, etc. in FIG. 3) from the carrier computing platform 152 to the materials handling facility operations logic 130 via the message service 140. For example, at reference numeral 308, the process 300 may include both the carrier computing platform 152 posting the vehicle run information messages to the message service 140 and the materials handling facility operations logic 130 accessing the vehicle run information messages from the message service 140. In one embodiment, each vehicle run information message includes one or more of the following data fields: a party or carrier identifier, a route identifier, a vehicle number, a carrier alpha code identifier, a trailer identifier, a trailer alpha code identifier, a facility identifier, a trailer asset identifier, a vehicle run identifier, an arrival time, and a message version identifier.

The carrier identifier may identify a carrier associated with the vehicle run information message, the route identifier may identify a route to be operated by the vehicle, the vehicle number may identify a number of the vehicle associated with the vehicle run information message, the carrier alpha code identifier may identify the carrier by Standard Carrier Alpha Code (SCAC) (e.g., UPZ or USZ in FIG. 4), the trailer identifier may identify one or more trailers attached to the vehicle associated with the vehicle run information message, the trailer alpha code identifier may identify the one or more trailers by the SCAC, the facility identifier may identify the facility where the vehicle is scheduled to arrive for container loading, the trailer asset identifier may provide another identifier for the one or more trailers attached to the vehicle, the vehicle run identifier may identify a run identifier for the route of the vehicle, the arrival time may provide an estimated time of arrival of the vehicle, and the message version identifier may identify a version of the vehicle run information message. The version of the vehicle run information message may be relied upon to update a sequence of related vehicle run information messages, for example.

In one embodiment, the vehicle run information messages may be relied upon to authenticate or authorize vehicles and/or vehicle drivers. For example, the vehicle run information messages may be used to compile a list of vehicles expected to arrive at the materials handling facility 10 over one or more periods of time. The list of expected vehicles may be provided as a display on a client device similar to the materials handling facility client device 170, for example, for easy reference by individuals at a guard house or other location at the materials handling facility 10. In this context, the expected vehicle display may provide a dashboard listing all the vehicles that are expected arrive within a given time period on a particular day, morning, afternoon, or evening, for example.

Referring again to FIG. 3, at reference numeral 310, the process 300 includes generating one or more move plan messages based on the one or more vehicle run information messages that were communicated at reference numeral 308 and/or based on the shipping or operations schedule. As illustrated in FIG. 3, the materials handling facility operations logic 130 generates the move plan messages. Generally, each move plan message provides instructions for loading, unloading, and/or transporting one or more containers. For example, a move plan message may provide instructions related to when a container is available for loading, where the container will be staged for loading, a time by which the container should be loaded, and a place to which the container should be transported. It should be appreciated that, in various embodiments, the instructions for moving a single container may be parsed into multiple move plan messages, or the instructions for moving several containers may be provided in a single move plan message.

In one embodiment, each move plan message includes one or more of the following data fields: an identifier of the move plan message, a facility identifier, a party or carrier identifier, a container identifier, a container availability start time, a container availability end time, a staging location, a container task operation code, an operation start time, an operation end time, a destination, and a message version identifier.

The identifier of the move plan message may identify a move plan using a unique identifier or code (e.g., Plan ID in FIG. 4), the facility identifier may identify a particular facility at which containers are to be loaded (e.g., the materials handling facility 10), the carrier identifier may identify a carrier specified for loading containers by Standard Carrier Alpha Code (SCAC), for example, the container identifier may identify one or more containers for loading, the container availability start time may identify one or more times at which individual ones of the containers are expected to be available for loading, the container availability end time may identify one or more times at which the containers should be loaded, the staging location may identify one or more dock doors, for example, where the one or more containers may be staged for loading, and the container task operation code may identify one or more carrier operations, such as loading, unloading, etc. Further, the operation start time may identify a time at which the operation specified in the task operation code should start, the operation end time may identify a time at which the operation should end or conclude, and the destination may identify a next or final destination for the containers associated with the message. Finally, the version of the move plan message may be relied upon to update a sequence of related move plan messages.

At reference numeral 312, the process 300 includes communicating the one or more move plan messages (e.g., m.1, m.2, m.3, etc. in FIG. 3) from the materials handling facility operations logic 130 to the carrier computing platform 152 via the message service 140. For example, at reference numeral 312, the process 300 may include both the materials handling facility operations logic 130 posting the move plan messages to the message service 140 and the carrier computing platform 152 accessing the move plan messages from the message service 140.

Based on the move plan messages, the carrier computing platform 152 may relay specific instructions to one or more of the carrier client devices 160. The instructions may specify the manner and/or timing at which one or more containers should be loaded or unloaded for certain routes.

At reference numeral 314, the process 300 includes a vehicle, such as the truck 20, arriving at a materials handling facility, such as the materials handling facility 10, for example. As further described below, when the driver of the truck 20 performs certain carrier operations at the materials handling facility 10, the driver may use the carrier client device 160 to provide feedback updates to the carrier computing platform 152. For example, when the driver of the truck 20 arrives at the materials handling facility 10, the driver may provide an input at a user interface of the carrier client device 160. The input may indicate arrival of the truck 20 at the materials handling facility 10. In turn, the carrier client device 160 communicates with the carrier computing platform 152 (e.g., via an Applications Programming Interface or other interface) to indicate the arrival. In this manner, the carrier computing platform 152 may monitor the operation of its fleet of vehicles and drivers in an ongoing manner. As another example, when the driver of the truck 20 begins loading a particular container, the driver may provide an input to the carrier client device 160 which indicates that the particular container is being loaded. In this case, the input to the carrier client device 160 may be provided by way of scanning a barcode printed on the label 50 (FIG. 1), for example, or scanning an RFID tag attached to the container 31.

As the carrier computing platform 152 continues to monitor the operations of its fleet of vehicles and drivers, the carrier computing platform 152 may post various messages, such as vehicle arrival update, load start update, move update, and load complete update messages, for example, to the message service 140. In FIG. 3, the posting of vehicle arrival update, load start update, and load complete update messages are illustrated at reference numerals 316, 318, and 324, respectively. Further, in FIG. 3, the posting of move update messages are illustrated at reference numerals 320 and 322. In turn, the materials handling facility operations logic 130 accesses the vehicle arrival update, load start update, move update, and load complete update messages from the message service 140. Based on the messages, the details of each of which is described in further detail below, the process 300 may include updating the shipping or operations schedule accordingly, at reference numeral 330.

The vehicle arrival update message may be posted by the carrier computing platform 152 to the message service 140 at reference numeral 316 when the carrier computing platform 152 receives feedback that the truck 20, for example, has arrived at the materials handling facility 10 or a dock door of the materials handling facility 10. In one embodiment, when the truck 20 arrives at the materials handling facility 10, the carrier client device 160 may indicate that the containers 31-33 are staged for loading at dock door 14 (FIG. 1). Upon arrival at the dock door 14 at reference numeral 315, the driver of the truck 20 may use the carrier client device 160 to scan a barcode or RFID at the dock door 14. The carrier client device 160 may then provide feedback to the carrier computing platform 152 at reference numeral 316 indicating that the truck 20 has arrived at the dock door 14, and the carrier computing platform 152 may post the vehicle arrival update message in response to that feedback at reference numeral 316. In turn, based on the vehicle arrival update message, the materials handling facility operations logic 130 may update the shipping or operations schedule at reference numeral 330, as further described below.

When the carrier computing platform 152 receives feedback that a driver of the truck 20, for example, has started a loading or unloading operation at reference numeral 317, the load start update message may be posted by the carrier computing platform 152 to the message service 140 at reference numeral 318. In turn, based on the load start update message, the materials handling facility operations logic 130 may update the shipping or operations schedule at reference numeral 330, as further described below.

When the carrier computing platform 152 receives feedback that a loading or unloading operation is ongoing for one or more of the containers 31-33, for example, at reference numerals 319 or 321, one or more move update messages may be posted by the carrier computing platform 152 to the message service 140 at reference numerals 320 or 322. For example, the driver of the truck 20 may use the carrier client device 160 to scan a barcode or RFID on each of the containers 31-33, individually, just before (or after) loading each of the containers 31-33 at reference numerals 319 or 321. The carrier client device 160 may then provide feedback to the carrier computing platform 152 indicating that a loading operation has started (or ended) for each of the containers 31-33, individually, and the carrier computing platform 152 may post one or more move update messages as the containers 31-33 are loaded at reference numerals 320 or 322. In turn, based on the move update messages, the materials handling facility operations logic 130 may update the shipping or operations schedule at reference numeral 330, as further described below.

Generally, each move update message includes information regarding a loading or unloading operation for one or more containers. Using the move update messages, the materials handling facility operations logic 130 may update the status of the containers in the materials handling facility 10. In one embodiment, each move update message includes one or more of the following data fields: a move plan identifier, a facility identifier, a trailer identifier, a status identifier, a container(s) identifier, a driver identifier, a time stamp, and a message version identifier. The move plan identifier may identify a move plan (i.e., "Plan ID" in FIG. 4), the facility identifier may identify a materials handling facility, the trailer identifier may identify one or more trailers attached to a truck of a carrier, for example, the status identifier may identify a status of the move plan (e.g., started, completed, ongoing, etc.), the container(s) identifiers may identify one or more containers being moved, the driver identifier may identify an individual responsible for the move operation, the time stamp may provide a time when the move operation was performed, and the message version identifier may be relied upon to update a sequence of related move plan messages.

When the carrier computing platform 152 receives feedback that a loading or unloading operation is complete at reference numeral 323, the load complete update message may be posted by the carrier computing platform 152 to the message service 140 at reference numeral 324. For example, the driver of the truck 20 may use the carrier client device 160 to indicate that all the containers 31-33 are loaded onto the truck 20 at reference numeral 323. The carrier client device 160 may then provide feedback to the carrier computing platform 152 indicating that the loading operation is complete at reference numeral 324. In turn, based on the load complete update message, the materials handling facility operations logic 130 may update the shipping or operations schedule at reference numeral 330, as further described below.

Referring again to FIG. 3, at reference numeral 330, the process 300 includes updating the shipping or operations schedule based on one or more of the vehicle arrival update, load start update, move update, and load complete update messages received at reference numerals 316, 318, 320, 322, or 324. In one embodiment, the operations schedule updater 136 (FIG. 2) may perform the updating based on the received messages. The updating at reference numeral 330 may include revising one or more data attributes of the containers that are awaiting disposition at the materials handling facility 10. For each container, the attributes may include an assigned route attribute, an assigned carrier attribute, a load state attribute (e.g., staged, loaded, ready to depart, departed), an expected load time attribute, or an actual load time attribute, for example, among others. These attributes, for each container, may be stored in the container attributes data store 122 and updated over time by the operations schedule updater 136 based on one or more of the vehicle arrival update, load start update, move update, or load complete update messages.

As one example, at reference numeral 330, the operations schedule updater 136 may revise one or more data attributes of certain containers in a move plan to reflect an actual load time for the containers upon receiving a load start update message. As another example, at reference numeral 330, upon receiving a move update message, the operations schedule updater 136 may revise one or more data attributes of certain containers to reflect a changed load state. In other words, the load state attribute for certain containers may be updated from staged to loaded. Further, at reference numeral 330, upon receiving a load complete update message, the operations schedule updater 136 may revise one or more data attributes to reflect a ready to depart state. Generally, any of the attributes illustrated as fields in FIGS. 4 and 5 may be updated based on the messages provided at reference numerals 316, 318, 320, 322, or 324. In turn, as further described below, the updates to the container attributes data store 122 may be relied upon to provide a real-time feedback display related to one or more loading or unloading operations at the materials handling facility 10.

Turning back to FIG. 3, it is noted that the updating at reference numeral 330 may include verifying one or more of the vehicle arrival update, load start update, move update, or load complete update messages. For example, if a particular load plan is started, the materials handling facility operations logic 130 may identify a move update message which is inconsistent with the load plan. In other words, if the particular load plan includes loading only the container 31 and not the containers 32 or 33, the materials handling facility operations logic 130 may identify an error if a move update message is received for loading either the containers 32 or 33. In this case, at reference numeral 326, the process 300 may include posting an error message to the message service 140. In turn the carrier computing platform 152 may access the error message at reference numeral 327 and forward an error indicator to the carrier client device 160. The error indicator may highlight the error to a driver of the truck 20, for example. As another example, if a particular load plan includes loading all the containers 31-33, but the container 33 is not loaded before receiving a load complete message, the materials handling facility operations logic 130 may identify an error and post an error message for the carrier computing platform 152.

Other examples of errors that may cause an error message to be posted to the message service 140 may include vehicle arrival at an incorrect location or dock door, arrival of an incorrect vehicle with respect to a load plan for the vehicle (e.g., the vehicle does not have adequate capacity, size, temperature control, weight capacity, etc., for the load plan), load plan started early or late (e.g., outside of planned loading windows), incorrect order of loading containers, incorrect handling of containers, load plan completed early or late (e.g., outside of planned loading windows), and others. Further, although FIG. 3 illustrates a single error message posted to the message service 140 at 136 and accessed at 137 by the carrier computing platform 152, it is understood that error messages may be provided at any point in the load plan, e.g., before, during, or after any of reference numerals 315-324.

Additionally, the updating may include verifying the status of one or more containers using the survey logic 138. As discussed above, by comparing a real-time survey of the containers 31-33 in the materials handling facility 10 and the ongoing communications between the carrier computing platform 152 and the materials handling facility operations logic 130, the materials handling facility operations logic 130 may identify errors or other problems in the operations at the materials handling facility 10. In various embodiments, the real-time survey of the containers 31-33 may be taken using one or more imaging devices, such as the camera 40 (FIG. 1), or one or more radio frequency identifier (RFID) tags, for example. If the real-time survey indicates, for example, that container 31 is being moved, although a move plan message indicates that container 32 is being loaded, the materials handling facility operations logic 130 may generate an error or trouble message. With reference to such an error message, an individual or operator at the materials handling facility 10 may be able to prevent an error in operations (e.g., mistaken loading) at the materials handling facility 10.

At reference numeral 332, the process 300 includes generating a network page for display as the shipping or operations schedule. The operations schedule display engine 142 (FIG. 2) may perform the generating. When rendered by the materials handling facility client device 170, the network page may provide a user interface similar to the list view of FIG. 4 or the floor plan view of FIG. 5, each of which is described in further detail below. The user interface may be provided on the display 60 (FIG. 1) (or another display of a client or display terminal) for easy reference by the driver of the truck 20, for example, when loading the containers 31-33. With reference to the user interface, as updated in an ongoing, real-time fashion, feedback may be provided to vehicle drivers and other individuals during loading operations.

Referring back to FIG. 3, at reference numeral 334, the process 300 includes performing a departure checkout. The departure checkout may be performed by a driver of the truck 20, for example, by checking in at a management station or counter at the materials handling facility 10. At the management station, operations personnel of the materials handling facility 10 may verify the shipping or operations schedule of the materials handling facility 10 and confirm completion of the load plan conducted by the driver of the truck 20. After the departure checkout at reference 334, the operations schedule updater 136 may revise one or more data attributes in the container attributes data store 122 to reflect a departed load state. In some embodiments, the departure checkout at reference numeral 334 may be omitted.

At reference numeral 336, the process 300 includes generating a consolidation report and, at reference numeral 338, posting the consolidation report to the message service 140 for access by the carrier computing platform 152. The consolidation report may include a consolidated list of the operations conducted in a move plan, for example, and provide a listing of the containers loaded, unloaded, etc. The consolidation report may also include a listing of the items contained within the containers loaded or unloaded.

According to aspects of the real time carrier communications and operations process 300, the operations of one or more carriers at the materials handling facility 10 may be tracked and/or monitored using the vehicle arrival update, load start update, move update, and load complete update messages in an ongoing, real-time fashion. Further, the operations at the materials handling facility 10 may be tracked and updated over time, and the computing environment 110 may assist with the generation of an ongoing, real-time display of the operations.

FIG. 4 illustrates an example list view display 400 of a shipping or operations schedule according to an embodiment of the present disclosure. As noted above, the display 400 may be rendered by the materials handling facility client device 170 as a user interface based on a display or network page generated by the operations schedule display engine 142. In the display 400, identifiers for move plan ID #s 1-6 are illustrated. For each move plan, a carrier, route, expected load time, actual load time, and numbers of staged, loaded, ready to depart and departed containers are listed. As illustrated, the move plan ID #s 1 and 2 have been completed, as it is clear from the display 400 that all of the containers which were staged for those plans have been loaded and are now departed. On the other hand, for the move plan ID #3, none of the containers which were staged have been loaded. In this case, because the current time is 15:18, an operator at the materials handling facility 10 may conclude that the carrier UPZ is late for loading, because the current time is past the expected load time of 13:52. For the move plan ID #4, it is clear from the display 400 that loading is in progress, because, of the five staged containers, two have been loaded. For the move plan ID #5, two of the staged containers are loaded and ready to depart. That is, for the move plan ID #5, not only have the two staged containers been loaded, but a load complete update message has also been received (e.g., at 324 of FIG. 3) from the carrier USZ, indicating that the containers are ready to depart. Also, it is clear that loading for the move plan ID #6 has not started as the expected load time is still in the future.

It should be appreciated that the display 400 is provided by way of example only. In various embodiments, the display 400 may include additional or fewer fields, rollover highlights, rollover popup messages, etc. For example, the display 400 may include a loading arrival, loading start, or loading complete time fields. Additionally, in certain embodiments, the display 400 may include highlights for certain problem or error conditions. In FIG. 4, for example, the fields for the move plan 3 are italicized because loading has not started by the expected load time. Alternatively, problem or error conditions may be indicated by various other means, such as bolding or underlining of text, use of different colors, flashing text, or other visual indicators, as well as audio alerts or messages. In other aspects, the display 400 may provide other options for organizing the ongoing operations at the materials handling facility 10. In one embodiment, as illustrated in FIG. 4, the operations may be filtered into scheduled move plans, move plans which are currently in progress, and move plans which are complete, using the tabs at the top of the display 400. Alternatively, the operations may be filtered based on other data, such as carrier identifier, route identifier, or any other data fields described above. Finally, it should be appreciated that the display 400 may be updated by the materials handling facility operations logic 130 over time to provide real-time feedback at each stage of loading or unloading operations.

Figure 5:
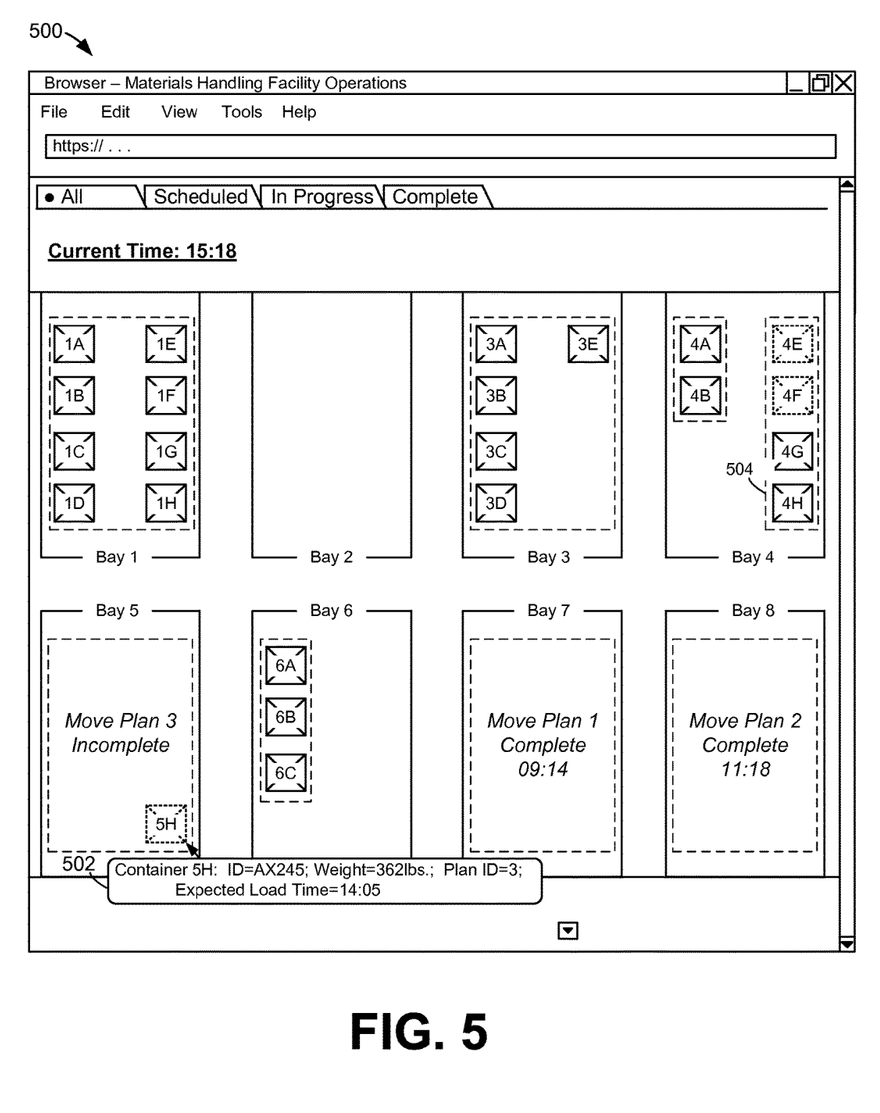
FIG. 5 illustrates an example floor plan view display of the shipping or operations schedule for the materials handling facility according to an embodiment of the present disclosure.

FIG. 5 illustrates an example floor plan view display 500 of the shipping or operations schedule according to an embodiment of the present disclosure. The display 500 may be rendered by the materials handling facility client device 170 as a user interface based on a display or network page generated by the operations schedule display engine 142. In FIG. 5, a floor plan of the materials handling facility 10, for example, is provided. The floor plan includes a staging area for each of bays 1-8. Bays 1, 3, 4, and 6 have containers staged for loading. Containers associated with individual move plans are surrounded by dashed boxes, such as box 504. Ongoing loading operations may be illustrated in the display 500 by highlighting one or more containers. In FIG. 5, it is noted that containers 4E and 4F are highlighted as being associated with an ongoing loading operation. Further, at bays 7 and 8, respectively, it can be seen that the move plan ID #s 1 and 2 are complete. Finally, at bay 5, it can be seen that the move plan ID #3 is incomplete, because the container 5H was not loaded. This condition may occur if a load complete update message is received from a carrier for the move plan ID #3 (e.g., at reference numeral 324 of FIG. 3), although no move update message was received for the container 5H. In this case, the mistake may be addressed upon receiving real-time feedback in response to the erroneous load complete update message, and/or while performing the departure checkout (e.g., at reference numeral 334 of FIG. 3).

It should be appreciated that the display 500 is provided by way of example only. In various embodiments, the display 500 may include additional or fewer fields, rollover highlights, rollover popup messages, etc. For example, the display 500 may present information using display elements such as the rollover or popup display balloon 502. The balloon 502 may provide additional details regarding the container 5H, for example, which was not loaded as part of the move plan ID #3. As illustrated in FIG. 5, the balloon 502 provides container identifier, weight, plan ID #, and expected load time information, although other relevant information may be provided. As another example, the display 500 may include loading arrival, loading start, or loading complete time fields for one or more containers. Additionally, in certain embodiments, the display 500 may include highlights for certain problem or error conditions. For example, problem or error conditions may be indicated by various means, such as italicizing, bolding or underlining of text, use of different colors, flashing text, or other visual indicators, as well as audio alerts or messages. In other aspects, the display 500 may provide other options for organizing the ongoing operations at the materials handling facility 10. In one embodiment, as illustrated in FIG. 5, the operations may be filtered into scheduled move plans, move plans which are currently in progress, and move plans which are complete, using the tabs at the top of the display 500. Alternatively, the operations may be filtered based on other data, such as carrier identifier, route identifier, or any other data fields described above. Finally, it should be appreciated that the display 500 may be updated by the materials handling facility operations logic 130 over time to provide real-time feedback at each stage of loading or unloading operations.

According to aspects of the embodiments, using the displays 400 or 500, for example, the operations of one or more carriers at the materials handling facility 10 may be tracked and/or monitored in an ongoing, real-time fashion. Further, the operations at the materials handling facility 10 may be tracked and updated over time, and the computing environment 110 may assist with the generation of an ongoing, real-time display of the operations. By reference to the displays 400 or 500, it may be possible for an operator at the materials handling facility 10 to identify holdups, backups, errors, or other problems in loading and/or unloading operations.

Figure 6:
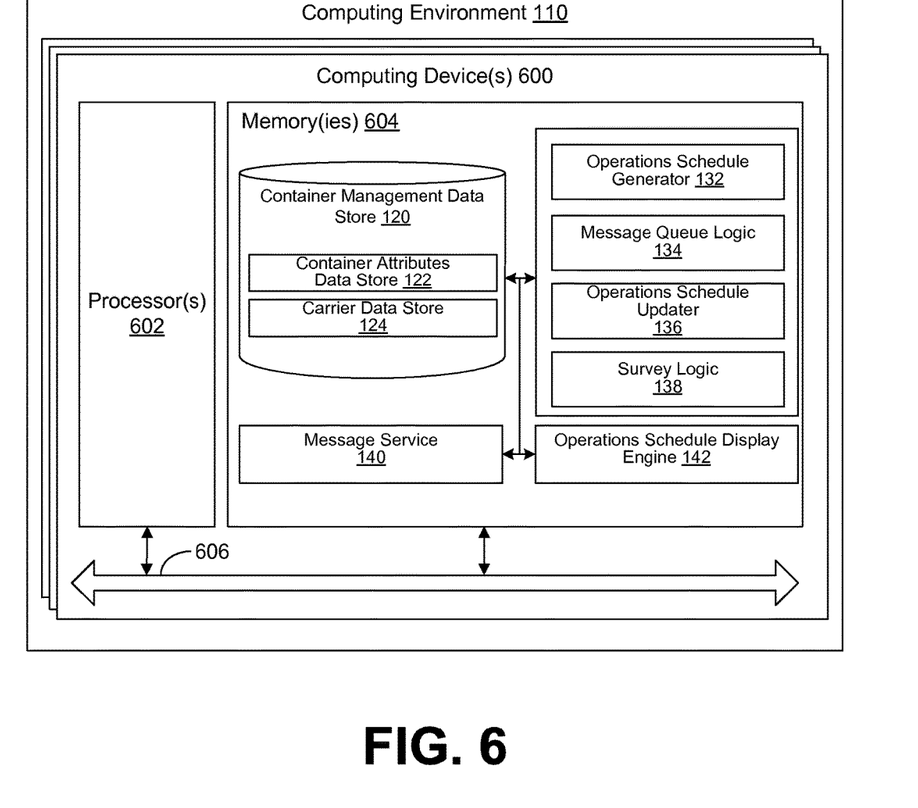
FIG. 6 illustrates an example schematic block diagram of the computing environment employed in the networked environment of FIG. 2 according to various embodiments of the present disclosure.

FIG. 6 illustrates an example schematic block diagram of the computing environment 110 employed in the networked environment 100 of FIG. 2 according to various embodiments of the present disclosure. The computing environment 110 includes one or more computing devices 600. Each computing device 600 includes at least one processing system, for example, having a processor 602 and a memory 604, both of which are electrically and communicatively coupled to a local interface 606. To this end, each computing device 600 may be embodied as, for example, at least one server computer or similar device. The local interface 606 may be embodied as, for example, a data bus with an accompanying address/control bus or other bus structure as can be appreciated.

In various embodiments, the memory 604 stores data and software or executable-code components executable by the processor 602. For example, the memory 604 may store executable-code components associated with the materials handling facility operations logic 130, for execution by the processor 602. The memory 604 may also store data such as that stored in the container management data store 120, among other data.

It should be understood and appreciated that the memory 604 may store other executable-code components for execution by the processor 602. For example, an operating system may be stored in the memory 604 for execution by the processor 602. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc. An executable program may be stored in any portion or component of the memory 604 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 604 may include both volatile and nonvolatile memory and data storage components. Volatile components are those that do not retain data values upon loss of power. Nonvolatile components are those that retain data upon a loss of power. Thus, the memory 604 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 602 may represent multiple processors 602 and/or multiple processor cores and the memory 604 may represent multiple memories that operate in parallel, respectively, or in combination. Thus, the local interface 606 may be an appropriate network or bus that facilitates communication between any two of the multiple processors 602, between any processor 602 and any of the memories 604, or between any two of the memories 604, etc. The local interface 606 may include additional systems designed to coordinate this communication, including, for example, a load balancer that performs load balancing. The processor 602 may be of electrical or of some other available construction.

As discussed above, the materials handling facility operations logic 130 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagram of FIG. 3 is representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 602. The machine code may be converted from the source code, etc. Further, each block may represent, or be connected with, a circuit or a number of interconnected circuits to implement a certain logical function or process step.

Although the flowchart or process diagram of FIG. 3 illustrates a specific order, it is understood that the order may differ from that which is depicted. For example, an order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the materials handling facility operations logic 130 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 3. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Further, any logic or application(s) described herein, including the adaptive topic logic, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 110. Additionally, it is understood that terms such as "application," "service," "system," "engine," "module," and so on may be interchangeable and are not intended to be limiting.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program executable in at least one computing device, the at least one program having instructions that perform a method comprising:

generating, by the at least one computing device, a shipping schedule for a materials handling facility;

accessing, by the at least one computing device, a message service to retrieve a vehicle run information message from a carrier;

generating, by the at least one computing device, a move plan message based at least in part upon the vehicle run information message and the shipping schedule;

posting, by the at least one computing device, the move plan message to the message service for access by the carrier;

accessing, by the at least one computing device, the message service to retrieve a load start update message from the carrier responsive to the carrier starting a loading operation according to the move plan message;

accessing, by the at least one computing device, the message service to retrieve at least one move update message from the carrier responsive to the carrier moving at least one container of the loading operation according to the move plan message;

generating, by the at least one computing device, a real-time survey of the materials handling facility, wherein generating the real-time survey comprises identifying a location of the at least one container in the materials handling facility using a camera;

comparing, by the at least one computing device, the location of the at least one container and an expected location of the at least one container from the shipping schedule in response to generating the real-time survey of the materials handling facility accessing, by the at least one computing device, the message service to retrieve a load complete update message from the carrier responsive to the carrier completing the loading operation according to the move plan message;

updating, by the at least one computing device, the shipping schedule based at least in part on at least one of the comparison between the location of the at least one container and the expected location of the at least one container from the shipping schedule, the load start update message, the at least one move update message, or the load complete update message; and providing, by the at least one computing device, feedback to at least one of the carrier or the materials handling facility at each stage of the loading operation by generating a page for display of the updated shipping schedule.

2. The non-transitory computer-readable medium of claim 1, the method further comprising accessing, by the at least one computing device, the message service to retrieve a vehicle arrival update message from the carrier.

3. The non-transitory computer-readable medium of claim 1, wherein the move plan message includes at least one of an identifier of the move plan message, a facility identifier, a carrier identifier, a container identifier, a container availability start time, a container availability end time, a staging location, or a container task operation code.

4. A system, comprising:
at least one memory device to store computer-readable instructions; and
at least one computing device configured, through execution of the computer-readable instructions, to perform a method comprising:
generating, by the at least one computing device, a shipping schedule for a materials handling facility;

generating, by the at least one computing device, a move plan message based at least in part on the shipping schedule, the move plan message including information for loading or unloading one or more containers by a carrier at the materials handling facility;

accessing, by the at least one computing device, at least one update message from the carrier responsive to the carrier at least one of starting a loading operation, moving at least one container for the loading operation, or completing a loading or unloading operation at the materials handling facility;

generating a survey of the materials handling facility, wherein generating the survey comprises identifying a location of the at least one container in the materials handling facility using a camera;

comparing the location of the at least one container and an expected location of the at least one container from the shipping schedule;

updating, by the at least one computing device, the shipping schedule based at least in part on the comparison between the location of the at least one container and the expected location of the at least one container from the shipping schedule or the at least one update message; and providing, by the at least one computing device, feedback to at least one of the carrier or the materials handling facility during at least one stage of the loading or unloading operation based at least in part on the updated shipping schedule.

5. The system of claim 4, wherein:
updating the shipping schedule comprises revising, by the at least one computing device, a data entry associated with at least one attribute of a container awaiting disposition at the materials handling facility; and
providing feedback comprises generating and displaying a network page for display, the network page for display including the shipping schedule and the at least one attribute of the container awaiting disposition at the materials handling facility.

6. The system of claim 5, wherein the at least one attribute of the container includes at least one of a load state attribute, an expected load time attribute, a route attribute, an assigned carrier attribute, or a truck identifier attribute.

7. The system of claim 5, wherein the network page includes at least one of move plan, carrier, route, expected load time, and actual load time display fields.

8. The system of claim 4, wherein the method further comprises:
accessing, by the at least one computing device, a vehicle run information message from the carrier, wherein generating the move plan message comprises generating the move plan message based at least in part upon the vehicle run information message and the shipping schedule.

9. The system of claim 4, wherein the method further comprises:
at least one of accessing, by the at least one computing device, a vehicle arrival update message from the carrier, or accessing, by the at least one computing device, a load complete update message from the carrier responsive to the carrier completing the loading or unloading operation,
wherein updating the shipping schedule comprises updating the shipping schedule based at least in part upon the vehicle arrival update message or the load complete update message.

10. The system of claim 4, wherein providing the feedback comprises providing information associated with error conditions of the loading or unloading operation.

11. The system of claim 10, wherein the error conditions include at least one of vehicle arrival at an incorrect location, arrival of incorrect vehicle for the loading or unloading operation, early or late start of the loading or unloading operation, incorrect loading or unloading of the one or more containers, incomplete loading or unloading of the one or more containers, incorrect order of loading or unloading of the one or more containers, incorrect handling of the one or more containers, or early or late completion of the loading or unloading operation.

12. The system of claim 10, wherein the error conditions are provided as italicized, bolded or underlined outputs, different colored outputs, flashing outputs, or audio alerts or messages.

13. The system of claim 4, wherein the updating of the shipping schedule is based at least in part on the survey of the materials handling facility, wherein the survey of the materials handling facility is based at least in part on inputs received from sensors, scanners or tag readers within the materials handling facility.

14. A method, comprising:
generating, by at least one computing device, a shipping schedule for a materials handling facility;
accessing, by the at least one computing device, a vehicle run information message from a carrier;
based at least in part upon the vehicle run information message and the shipping schedule, generating, by the at least one computing device, a move plan message associated with containers awaiting a loading or unloading operation by the carrier;
accessing, by the at least one computing device, at least one move update message from the carrier during at least one stage of the loading or unloading operation of the move plan message;
generating, by the at least one computing device, a survey of the materials handling facility, wherein generating the survey comprises identifying a location of at least one container in the materials handling facility using a camera;
comparing, by the at least one computing device, the location of the at least one container and an expected location of the at least one container from the shipping schedule;
updating, by the at least one computing device, the shipping schedule based at least in part upon the at least one move update message or the comparison between the location of the at least one container and the expected location of the at least one container from the shipping schedule, and
providing, by the at least one computing device, feedback to at least one of the carrier or the materials handling facility during at least one stage of the loading or unloading operation of the move plan message by generating a page for displaying the updated shipping schedule.

15. The method of claim 14, further comprising accessing, by the at least one computing device, a vehicle arrival update message from the carrier.

16. The method of claim 15, further comprising:
accessing, by the at least one computing device, a load start update message from the carrier responsive to the carrier starting the loading or unloading operation; and
accessing, by the at least one computing device, a load complete update message from the carrier responsive to the carrier completing the loading or unloading operation.

17. The method of claim 16, further comprising updating the shipping schedule based at least in part upon at least one of the vehicle arrival update message, the load start update message, or the load complete update message.

18. The method of claim 14, wherein the move plan message includes at least one of an identifier of the move plan message, a facility identifier, a carrier identifier, a container identifier, a container availability start time, a container availability end time, a staging location, or a container task operation code.

19. The method of claim 14, wherein generating the shipping schedule comprises determining at least one of a carrier, a route, or expected load time for at least one container in the materials handling facility.

20. The method of claim 14, wherein updating the shipping schedule comprises revising a data entry associated with at least one attribute of a container awaiting disposition at the materials handling facility.

* * * * *